United States Patent [19]

Abbott

[11] 4,412,846
[45] Nov. 1, 1983

[54] FUELS CONTAINING N-SUBSTITUTED AMINO MORPHOLINES

[75] Inventor: Franklin P. Abbott, Brooklyn, Ohio

[73] Assignee: The Lubrizol Corporation, Wickliffe, Ohio

[21] Appl. No.: 261,365

[22] Filed: May 7, 1981

Related U.S. Application Data

[63] Continuation of Ser. No. 32,440, Apr. 23, 1979, abandoned, which is a continuation-in-part of Ser. No. 732,612, Oct. 15, 1976, abandoned, which is a continuation-in-part of Ser. No. 627,575, Oct. 31, 1975, Pat. No. 3,989,476, which is a continuation-in-part of Ser. No. 480,764, Jun. 19, 1974, abandoned.

[51] Int. Cl.³ .............................. C10L 1/22
[52] U.S. Cl. ........................................ 44/63
[58] Field of Search ........................ 44/63, 70

[56] References Cited

U.S. PATENT DOCUMENTS

| Re. 27,582 | 2/1973 | Kahn et al. | 252/32.7 |
|---|---|---|---|
| 2,041,854 | 5/1936 | Neal | 18/50 |
| 2,239,841 | 4/1941 | Cook | 252/51 |
| 2,483,434 | 10/1949 | Rieveschi | 260/570 |
| 2,533,300 | 12/1950 | Watkins | 252/34 |
| 2,684,292 | 7/1954 | Caron et al. | 44/68 |
| 2,687,377 | 8/1954 | Stewart et al. | 252/51.5 |
| 2,687,378 | 8/1954 | Goldschmidt et al. | 252/51.5 |
| 3,392,170 | 7/1968 | D'Amico et al. | 260/247.5 |
| 3,864,098 | 2/1975 | Honnen | 44/58 |
| 3,989,476 | 11/1976 | Abbott | 44/63 |

FOREIGN PATENT DOCUMENTS

| 1121578 | 7/1968 | United Kingdom. |
|---|---|---|
| 1236161 | 6/1971 | United Kingdom. |
| 1254074 | 11/1971 | United Kingdom. |

*Primary Examiner*—Charles F. Warren
*Assistant Examiner*—Y. Harris-Smith
*Attorney, Agent, or Firm*—Ronald L. Lyons; Raymond F. Keller

[57] ABSTRACT

Normally liquid fuel compositions containing N-substituted morpholines of the formula

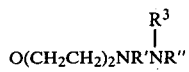

wherein R' is a divalent organic radical of at least one to about 30 carbon atoms, $R^3$ is a hydrogen atom or a hydrocarbyl, a hydroxy-substituted hydrocarbyl or a hydroxy hydrocarbyleneoxy-substituted hydrocarbyl radical of at least one carbon atom and R" is a monovalent hydrocarbon radical of at least thirty carbon atoms, exhibit improved carburetor detergency and anti-icing properties. These fuels also inhibit deposit formation in the intake systems of internal combustion engines. Particularly preferred are gasolines containing morpholines wherein R' is 1,3-propylene, or poly(ethyleneoxy), R" is a hydrocarbyl group of at least about forty carbon atoms and $R^3$ is hydrogen.

18 Claims, No Drawings

FUELS CONTAINING N-SUBSTITUTED AMINO MORPHOLINES

REFERENCE TO RELATED APPLICATIONS

This application is a continuation of U.S. application Ser. No. 32,440, filed Apr. 23, 1979, which in turn is a continuation-in-part of U.S. application Ser. No. 732,612, filed Oct. 15, 1976, now abandoned which in turn is a continuation-in-part of U.S. Ser. No. 627,575, filed Oct. 31, 1975, now U.S. Pat. No. 3,989,476, which in turn is a continuation-in-part of U.S. application Ser. No. 480,764, filed June 19, 1974, now abandoned. The disclosures of these prior applications are hereby incorporated by reference in this application in their entirety.

The N-substituted morpholines, concentrates of them in oils and lubricant compositions containing them disclosed herein are not part of my invention but rather are the invention of Norman Anthony Meinhart and Robert Widmer described in application Ser. No. 598,961, filed July 24, 1975, now U.S. Pat. No. 4,042,513, which is a continuation-in-part of U.S. application Ser. No. 562,732, filed Mar. 27, 1975, now abandoned, which in turn is a continuation-in-part of U.S. application Ser. No. 480,767, filed June 19, 1974, now abandoned.

FIELD OF THE INVENTION

This invention relates to normally liquid fuel compositions containing N-substituted amino morpholines having at least one hydrocarbyl group of at least thirty carbon atoms.

BRIEF DESCRIPTION OF THE PRIOR ART

U.S. Pat. Nos. 3,275,554; 3,438,757; 3,454,555; 3,484,859; 3,575,804; 3,753,670; and 3,775,433 disclose lubes and fuels containing reaction products formed from halogenated polyolefins and mono- or polyamines including certain heterocyclic amines.

French application No. 2,143,128 discloses high molecular weight polyamines wherein at least one amino group is substituted with one or more hydroxyalkyl groups.

SUMMARY OF THE INVENTION

The fuel compositions of this invention contain N-substituted morpholines of the formula

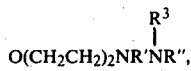

wherein R' is a divalent organic radical of at least one to about 30 carbon atoms, $R^3$ is a hydrogen atom or a monovalent hydrocarbyl, hydroxy-substituted hydrocarbyl or hydroxy hydrocarbyleneoxy-substituted hydrocarbyl radical of at least one carbon atom and R'' is a monovalent hydrocarbyl radical of at least thirty carbon atoms.

DESCRIPTION OF THE INVENTION

The R' group in the N-substituted morpholines used in making the fuel compositions of this invention is a divalent organic radical of at least one to about 30 carbon atoms, preferably one to about six carbon atoms; more preferably it is an aliphatic radical of one to about three carbon atoms. In its broadest aspect, the R' group can be hydrocarbyl or hydrocarbyl interrupted-with-Y groups (as Y is defined hereinbelow). It should be noted that when the term "hydrocarbyl" is used in describing a radical or group in this specification and the appended claims it is intended also to embrace substantially hydrocarbyl groups unless expressly stated to the contrary. Substantially hydrocarbyl groups are those hydrocarbyl groups which are substituted with non-hydrocarbyl substituents (such as those enumerated below) which do not substantially affect the hydrocarbyl character and nature of the group in the context of this invention. Such groups would be considered to be within the scope of the term hydrocarbyl by the skilled worker in the art to which the invention pertains.

For example, it is obvious that a $C_{20}$ alkylene group and a $C_{20}$ alkylene group substituted with a methyl mercapto or methoxy group would be substantially similar in their properties with regard to their use in this invention and would, in fact, be recognized as equivalents by the artisan or ordinary skill. Non-limiting examples of substituents that do not significantly alter the hydrocarbyl nature of the hydrocarbyl groups of this invention include the following:

ether (especially hydrocarbyloxy and particularly alkoxy groups of up to ten carbon atoms)

nitro cyano hydroxy fluoro (e.g., monofluoro, trifluoromethyl, etc.)

aromatic halo (e.g., a halogen atom bonded directly to a carbon atom of an aromatic ring)

thioether (especially $C_1$–$C_{10}$ alkyl thioethers)

sulfonyl (—$SO_2$)

Sulfinyl (—SO—)

Other such non-hydrocarbyl groups will be apparent to those of skill in the art.

When such non-hydrocarbyl substituents are present in a hydrocarbyl radical or group of a compound used in the present invention there will generally be no more than two such substituents for every ten carbon atoms in the hydrocarbyl radical or group; preferably, no more than one for each ten carbon atoms. Generally, however, it is preferred that no such substituents be present and the hydrocarbyl radicals and groups of the present invention be purely hydrocarbyl; that is, they are without non-hydrocarbyl substituents. Ordinarily, these hydrocarbyl radicals and groups will be free from ethylenic or acetylenic unsaturation.

Exemplary of purely hydrocarbyl R' radicals or groups are the saturated and unsaturated aliphatic divalent groups of one to thirty carbon atoms such as methylene, ethylene, 1,2-propylene, 1,3-propylene (i.e., trimethylene), 1,2-n-butylene, 1,3-isobutylene, 1,4-pentylene, 1,3-hexylene, 1,2-dodecylene, 1,9-octadecylene, 1,2-butadienyl, 1,4-butadienyl, 1,2,dec-5,6-enyl, etc. Examples of saturated and unsaturated alicyclic radicals or groups include 1,2-cyclohexadienyl, 1,2-cyclopentadienyl, etc. Examples of aromatic divalent R' radicals or groups include, 1,2-phenylene, 1,4-phenylene, 2,5-tolylene, 1,8-naphthylylene, etc. Examples of groups wherein R' is substantially hydrocarbyl have been given above. For example, R' can be one of the following:

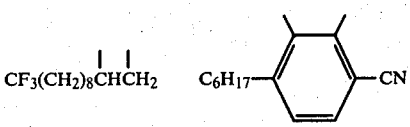

-continued

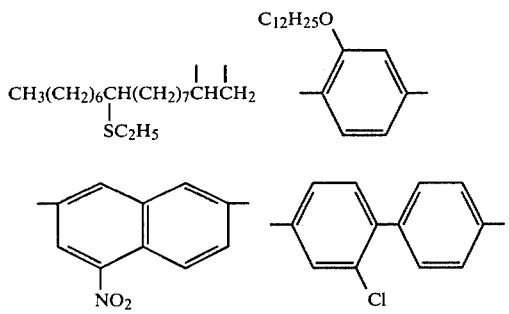

etc.

As noted above, R' can be a hydrocarbyl radical interrupted by the Y groups, usually between one and about six Y groups, In this context, Y is an oxygen or sulfur atom or a

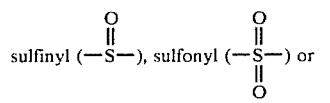

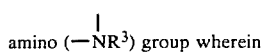

$R^3$ is as defined hereinabove. Examples of such radicals are polyoxyalkylene groups wherein the alkylene group contains one to about six carbon atoms. Further examples wherein R' is interrupted by Y groups are the following:

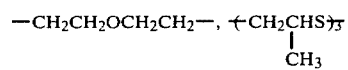

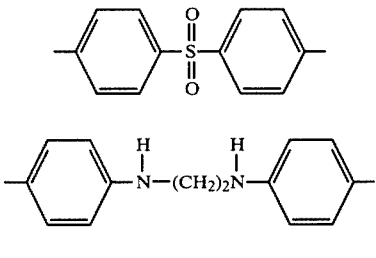

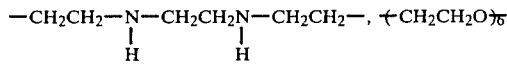

All the Y's in various parts of the R' group do not have to be the same, for example, the following are embraced within the above definition of R':

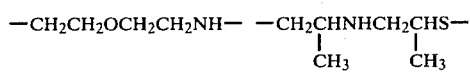

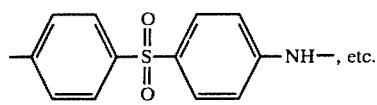

In the amino group,

$R^3$ can be a hydrogen atom, a monovalent hydrocarbyl, hydroxy-substituted hydrocarbyl, or hydroxy hydrocarbyleneoxy-substituted radical of at least one carbon atoms. In certain cases $R^3$ can be R' and in others a $C_1$ to $C_{29}$ hydrocarbyl group. When $R^3$ is R" all the preferences explained herein during the discussion of R" apply.

Typically $R^3$ is free of olefinic or acetylenic unsaturation and contains up to ten carbon atoms. More preferably $R^3$ is hydrogen or a $C_{1-8}$ alkyl or phenyl group. Examples of $R^3$ groups include methyl, ethyl, propyl, phenyl, benzyl, tolyl, cyclopentyl, octyl, isooctyl, heptyl, cyclohexyl, butadienyl, dodecyl, dodecenyl, etc. groups.

$R^3$ can also be a hydroxy-substituted hydrocarbyl radical containing one or two hydroxy groups and 1 to about 29 carbon atoms. Exemplary of such groups are 2-hydroxyethyl, 3-hydroxy-propyl, 3,4-dihydroxybutyl, etc. $R^3$ can also be a hydroxy hydrocarbyleneoxy-substituted hydrocarbyl radical containing 1 or 2 hydroxy groups and 1 to about 6 oxy (i.e., oxa) groups. Exemplary of such groups are the following:

—CH$_2$CH$_2$OCH$_2$CH$_2$OH,

—C$_6$H$_4$OCH$_2$CH$_2$OH,

—CH(CH$_3$)CH$_2$OCH(CH$_3$)CH$_2$OH, etc.

Usually, however, as indicated above, $R^3$ is a hydrogen atom or hydrocarbyl group of 1 to about 29 carbon atoms.

The N-substituted morpholines of the present invention contain at least one R" radical which is hydrocarbyl radical of at least thirty carbon atoms. Preferably, R' will have at least about forty carbon atoms, and more preferably, at least about seventy carbon atoms. In a preferred embodiment it has no more than 1000 carbon atoms. In more preferred embodiments it has no more than 250 carbon atoms. The hydrocarbyl radicals R" can be derived from pure chemical compounds or from animal or plant sources such as tallow or coconut oil which are usually mixtures of compounds of homologous structure. They can also be derived from mineral sources such as cracked wax olefins, various petroleum oil fractions, etc. More preferably, however, they are derived from polymerization (or copolymerization) of a low molecular weight $C_2$-$C_8$ 1-monoolefin such as ethylene, propylene, 1-butene, isobutene, styrene, hexene, etc. Polymers of medial olefins of two to eight carbons can also be used. Examples are 2-butene, 3-pentene and 4-octene.

In certain preferred embodiments the R" group is derived from a halogenated hydrocarbon of at least thirty carbon atoms, wherein one or more halogen atoms are directly bonded to aliphatic carbon atoms. Chlorinated and brominated hydrocarbons are preferred with chlorinated hydrocarbons being especially preferred. Many such compounds are well known to those of the art. Specific examples include p-(n-octacosyl)benzyl chloride, 1-iodotetracontane, 3-bromotricontane, 6-chloro-pentacontane, etc. Mixtures of such compounds can also be used.

As noted above, however, it is often preferred that R″ be derived from an olefinic polymer of a low molecular weight 1-olefin; sometimes with an intermediate step of halogenating the polymer. Useful halogenated olefinic polymers have number average molecular weights ($\overline{M}n$) ranging from about 420 to about 100,000 (still higher molecular weight derivatives may be useful and actually preferred when it is desired that the N-substituted morpholines have viscosity improving properties in lubricating oil). Especially useful are halogenated polymers having minimum $\overline{M}n$'s of about 600. A preferred maximum $\overline{M}n$ is about 6000. Illustrative of such polymers are those halogenated polymers having $\overline{M}n$'s of 600, 800, 1900, 2500, 3000, etc. ($\overline{M}n$'s of up to about 7000 are measured by Vapor Pressure Osmometry of Gel Permeation Chromatography while higher $\overline{M}n$'s are by viscometric techniques.)

Interpolymers of the afore-described $C_{2-8}$ olefins can also be used as a source of materials for the halogenated polymers of the present invention. Such interpolymers include, for example, those prepared by polymerizing isobutene with ethylene; ethylene with propylene; propylene with 1-butene; 1-octene with 1-hexene; 1heptene with 1-pentene; 3-methyl-1-butene with 1-octene; etc.

The polymers used as a source of R″ should preferably contain at least 80%, more preferably at least 95%, saturated units derived from an aliphatic monoolefin and no more than 5% olefinic linkages based on the total number of carbon-to-carbon carbon covalent linkages present. Specific examples of such polymers include a homopolymer of isobutylene, a copolymer of ethylene (65%) and propylene, a copolymer of 95% isobutene with 5% allene; a terpolymer of 95% isobutene with 4% propene and 1% butadiene; a copolymer of 80% 1-hexene with 10% 1-heptene; etc. (All percentages and parts in this specification and the appended claims are percentages by weight and parts by weight unless otherwise specified.)

Chlorinated and brominated polymers of butene, particularly isobutene, are especially preferred sources of the R″ radicals. Such polymers are conveniently obtained by polymerizing a butene such as isobutene with the use of a Friedel-Crafts catalyst such as aluminum chloride, boron trifluoride, titanium tetrachloride or the like. When commercial isobutene is used in the polymerization, the polymer may contain a small amount of polymerized units of 1-butene or 2-butene which are often present as impurities in commercial isobutene. For the purposes of this invention, a polyisobutene may thus contain small proportions of polymerized or interpolymerized 1-butene or 2-butene.

The halogenated hydrocarbons from which R″ can be derived are conveniently prepared by treating suitable hydrocarbons, such as polymers described above, with halogenating agents such as chlorine, bromine, N-bromo-succinimide, N-iodo-phthalimide, etc. Such techniques are well known to those of skill in this art. For example, the treatment can be carried out simply by contacting the hydrocarbon with the halogenating agent at a temperature from about 50° C., preferably from about 80° C., up to any temperature below the decomposition point of the reaction mixture. Usually such halogenations are carried out between 80° and 250° C., the exact temperature being determined by the precise nature of the halogenating agent and hydrocarbon to be halogenated. The relative amounts of hydrocarbon and halogenating agent used in the reaction are such as to provide incorporation of an average of at least about one atomic proportion of halogen per hydrocarbon molecule and up to about one atomic proportion of halogen per 25 aliphatic carbon atoms in the hydrocarbon molecules. Such amounts, in most instances, are about one mole of the hydrocarbon and at least about one mole of the halogenating agent.

Halogenated polymers useful for incorporating R″ into the N-substituted morpholines of this invention contain an average of at least one and often two or more, such as ten, atomic proportions of halogen per polymer molecule, especially in instances where the hydrocarbon is of relatively high molecular weight such as 1000 or higher. In most instances, the halogen contents of such halogenated hydrocarbons are between about 0.1% and 15%; preferably the minimum is about 2% and the maximum is about 9% of the total weight of the halogenated hydrocarbon. To form the more highly halogenated polymers, of course, two or more moles of the halogenating agent are used.

The halogenation can be carried out in the presence of a substantially inert solvent or diluent such as carbon tetrachloride, chloroform, chlorobenzene, benzene, etc. The reaction is often accompanied by the formation of hydrogen halide which may simply be allowed to escape from the reaction mixture as the treatment proceeds. The precise chemical composition of the halogenated polymer is not always known; it is known, however, that such product does, on the average, contain about one or more halogen substituents per molecule.

It is also possible to form a suitable halogenated polymer by interpolymerization of, e.g., isobutene, with a halogenated monomer such as chloroprene, vinyl bromide, etc., by selecting a proper ratio or non-halogenated polymerizable olefin to polymerizable halo-olefin to achieve a halogen content in the interpolymer within the limits set forth above.

The method by which the halogen is incorporated into the olefin polymer is not critical to the practice of this invention. Hence, any method known to the art for halogenating hydrocarbons can be used and products of such methods are contemplated for use as reactants in this invention. Also, it is clear that mixtures of halogenated hydrocarbons can be used.

From the foregoing, it is apparent that $R^{41}$ is normally aliphatic and purely hydrocarbyl in nature.

Many methods for making the N-substituted morpholines of the present invention will be obvious to those of skill in the art. A particularly preferred method is to react an N-substituted morpholine intermediate of the structure

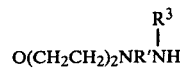

with the afore-described halogenated polymer in a molar ratio of one substituted morpholine intermediate to about 1-2 equivalents of the halogenated polymer. (An equivalent of polymer is equal to its molecular weight divided by the average number of halogen atoms its molecules contain.)

Such N-substituted morpholine intermediates can be made by a number of methods equally well known to those of skill in the art. For example, morpholine itself can be reacted in Michael Addition with the commercially plentiful acrylonitrile and the product obtained hydrogenated to provide 3-aminopropyl morpholine.

Morpholine can also be reacted with an appropriately substituted low molecular weight amino organo halide to produce the desired N-substituted morpholine intermediate, e.g.,

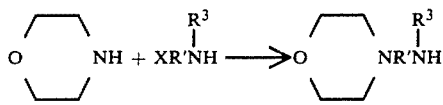

X=Halogen, and R' as defined above.

The reaction of the afore-described N-substituted morpholine intermediates with the afore-described halogenated hydrocarbon can be carried out by techniques well known to those of skill in the art using about 1 to about 2 equivalents of halogenated hydrocarbon per mole of N-substituted morpholine intermediate. Often it is preferable and convenient to have a hydrogen halide acceptor present during this reaction. Examples of such acceptors include metal and ammonium carbonates, bicarbonates, oxides, hydroxides, amines, (in particular, tertiary amines such as pyridines) and salts of organic acids such as salts of carboxylic acids, in particular, the alkali metal salts or alkaline earth metal salts of lower carboxylic acids.

Among the useful acceptors, preference is given to carbonates, bicarbonates, oxides and hydroxides, since upon reaction with the hydrogen halide formed during the reaction, in addition to metal halide and water, only carbon dioxide is formed. Although, in general, carbonate, bicarbonates, oxides and hydroxides of any metal are useful hydrogen halide acceptors, the alkali metal and alkaline earth metal compounds are preferred. In particular, sodium, potassium, lithium, calcium and magnesium salts are preferred. These hydrogen halide acceptors are preferably employed in quantities such that from about one to two gram equivalents of the acceptor is present in the reaction mixture per gram equivalent of the halogen present in the halogenated hydrocarbon. Generally, about 0.5 to about 2 moles of hydrogen halide acceptor per gram atom of hlide present are used. Usually when such an acceptor is used, N-substituted morpholines are obtained which contain less than 1.0% halogen. Typically these N-substituted morpholines have halogen contents of about 0.15–0.6% halogen (e.g., chlorine) or less.

Generally, reacting the afore-described N-substituted morpholine intermediate with the halogenated hydrocarbon will offer no problems to those of skill in the art. The reaction is preferably carried out in the presence of the afore-described hydrogen halide acceptor, in a substantially inert solvent, at about 20° C. to about 250° C., for about 0.5 hour to about twenty-four hours, though these reaction temperatures and times can be varied according to the peculiarities of the specific reactants used.

Suitable substantially inert solvents or diluents for such reactions include relatively low boiling, readily available hydrocarbon solvents such as pentane, heptane, benzene, toluene and xylene as well as oxygenated materials such as the lower alkanols and ketones and high boiling hydrocarbon materials such as processed and neutral oils, bright stocks and various other types of lubricating oil base stocks. If desired, the product can be recovered from such solvents or diluents by standard procedures such as distillation, evaporation, precipitation, etc. Alternatively, if the solvent or diluent is, for example, a lubricating oil base or a low molecular weight hydrocarbon, the product can be left in the solvent/diluent to form a concentrate. Ultimately such concentrates can easily be blended with the desired liquid fuel to provide the desired fuel composition.

The following examples describe the preparation of N-substituted morpholines suitable for use in the fuel compositions of this invention. In these examples, as elsewhere in this specification and the appended claims, all parts and percentages are parts by weight and percents by weight unless it is expressly stated to the contrary.

EXAMPLE 1

A mixture of 17.75 parts of isopropyl alcohol, 17.75 parts xylene, 7.2 parts N-aminopropyl morpholine and 4.19 parts of a saturated aqueous solution of sodium hydroxide is heated to 75° C. To this mixture is slowly added, over 1.5 hours, 35.5 parts of a polyisobutenyl chloride having a $\overline{M}n$ of 1000 containing 5% chlorine. The reaction mixture is heated to 95°–98° C. for five hours and then stripped to a pot temperature of 175° C. over 9.5 hours. The organic phase is carefully decanted from the solids and the solids rinsed with xylene. The combined organic layers are vacuum stripped to 205° C./1 mm Hg. Xylene (15.79 parts) is added to the residue to give a 70% active concentrate of desired product which can be filtered through diatomaceous earth to improve its clarity. The concentrate has a nitrogen content of 1.28% (Kjeldahl) to 1.51% (Dumas).

EXAMPLE 2

Example 2 is carried out in essentially the same fashion as Example 1, except twice as much chlorinated polyisobutene is used. The desired dihydrocarbyl-substituted aminopropyl morpholine is obtained.

EXAMPLE 3

A mixture of 139.4 parts of aminated N-ethoxylated morpholine containing 4-(2-aminoethoxy)ethyl morpholine as a component, and sold as Amine C-6 by the Jefferson Chemical Co., aqueous sodium hydroxide solution containing 24 parts of sodium hydroxide, 100 parts of isopropyl alcohol and 100 parts xylene is heated under nitrogen to 70° C. Four hundred fifteen parts of polyisobutenyl chloride containing 4.3% chlorine and having a $\overline{M}n$ of 1300 is slowly added to the reaction mixture which is then heated to 160° C. for seven hours. The mixture is filtered to remove solids and stripped to 155° C./1 mm Hg. Diluent oil (190 parts) is added and the solution filtered through diatomaceous earth to provide the desired product as filtrate containing 30% diluent oil. This concentrate has a nitrogen content of 1.43%.

EXAMPLE 4

Example 4 is carried out in essentially the same fashion as Example 3 except that the polyisobutenyl chloride is replaced with a polyisobutenyl chloride having a $\overline{M}n$ of 300 and, on the average, one chlorine atom per molecule.

EXAMPLE 5

Chlorine gas is passed at a rate of 1.25 parts per minute through 500 parts of polyethylene of $\overline{M}n$ 2500 and $\overline{M}w$ (weight average molecular weight) of 5000 as measured by gel permeation chromatography. The polyethylene is held at 115° C.–124° C. under nitrogen and irradiated with light from a commercial sun lamp. Chlorination is continued for 1 hour and the polyethylene then purged with a nitrogen stream for 1 hour to give 531 parts of a chlorinated product.

A mixture of 100 parts of the chlorinated product described above and 24 parts of N-aminopropyl morpholine is heated at 190°–200° C. for 9 hours. A mixture of 125 parts xylene and 42 parts saturated aqueous sodium hydroxide is then added and the reaction mixture held at 100°–110° C. for 1 hour. The organic layer is separated, dried by azeotropic distillation and stripped to 180° C./15 mm Hg. Diluent oil (66 parts) is added and the mixture filtered through diatomaceous earth at 110° C. to give as the filtrate a 60% active solution of the desired N-substituted morpholine.

EXAMPLE 6

To a mixture of 559 parts of N-aminopropyl morpholine, 42 parts of 50% aqueous sodium hydroxide, 178 parts of isopropyl alcohol and 178 parts of xylene at 80° C. is added a mixture of chlorinated polybutene (having an average of about 100 carbon atoms and 1 chlorine atom per molecule) and 300 parts of xylene. The mixture is heated to reflux (93° C.) and held there for 2 hours. Isopropyl alcohol is stripped from the mixture as it is heated to 140° C., it is held at this temperatue for 4 hours. Solids are removed by filtration and the filtrate stripped to 160° C. at reduced pressure. Xylene (178 parts) is added to the residue to yield a solution of the desired product containing 30% xylene and 1.02% nitrogen and 1.01% chlorine.

EXAMPLE 7

To a mixture of 72 parts N-aminopropyl morpholine, 42 parts of 50% aqueous sodium hydroxide, 225 parts of isopropyl alcohol and 225 parts of xylene at 75° C. under nitrogen atmosphere is slowly added 450 parts of chlorinated polypropylene (containing an average of 60 carbon atoms per molecule) and 3.93% chlorine. The reaction mixture is held at 95°–98° C. for 5 hours while solvent slowly distills from it. The temperature is then increased to 130° C. over 1.5 hours. After storage for 16 hours at 15° C., the reaction is heated to 165° C. and held there for 6.5 hours. Provision is made for removing distillate from the reaction mixture during this period. The reaction mixture is then heated to 175° C. over 2 hours and filtered through fine cloth. Solids collected are washed with 304 parts of xylene and the combined filtrates stripped at 150° C./20 mm Hg. Continued stripping at 205° C./1 mm Hg and filtration of the residue followed by dilution with 190 parts xylene provides a solution of the desired product containing 30% xylene, 0.85% nitrogen and 0.69% chlorine.

The fuel compositions of the present invention contain a major proportion of a normally liquid fuel, usually a hydrocarbonaceous petroleum distillate fuel, such as motor gasoline, as defined by ASTM Specification D-439-73, diesel fuel or fuel oil as defined by ASTM Specification D-396. Fuel compositions containing non-hydrocarbonaceous materials such as alcohols, ethers, organo-nitro compounds and the like are also within the scope of this invention. Particularly preferred is gasoline, that is, a mixture of hydrocarbons having an ASTM boiling point of about 60° C. at the 10% distillation point to about 205° C. at the 90% distillation point.

Generally, these fuel compositions contain an amount of the N-substituted morpholines of this invention sufficient to endow the fuel with detergent properties; usually this amount is 1 to 50,000, preferably 4 to 5000, parts by weight of the reaction product per million parts by weight of fuel. The preferred gasoline-based fuel compositions generally exhibit excellent carburetor and intake system deposit detergency and anti-icing properties thus allowing the formation of clean, non-water-containing fuel compositions.

The fuel compositions of this invention can contain, in addition to the morpholines of this invention, other additives which are well known to those of skill in the art. These can include anti-knock agents such as tetraalkyl lead compounds, lead scavengers such as haloalkanes, deposit preventors or modifiers such as triaryl phosphates, dyes, cetane improvers, anti-oxidants such as 2,6-di-tertiary-butyl-4-methylphenol, rust inhibitors, such as alkylated succinic acids and anhydrides, bacteriostatic agents, gum inhibitors, metal deactivators, upper cylinder lubricants and the like.

In certain preferred fuel compositions of the present invention, the afore-described N-substituted morpholines are combined with an ashless dispersant in gasoline. Such ashless dispersants are preferably esters of a mono- or polyol and a high molecular weight mono- or polycarboxylic acid acylating agent containing at least 30 carbon atoms in the acyl moiety. Such esters are well known to those of skill in the art. See, for example, French Pat. No. 1,396,645; British Pat. Nos. 981,850 and 1,055,337; and U.S. Pat. Nos. 3,255,108; 3,311,558; 3,331,776; 3,346,354; 3,522,179; 3,579,450; 3,542,680; 3,381,022; 3,639,242; 3,697,428; 3,708,522; and British Patent Specification No. 1,306,529. These patents are expressly incorporated herein by reference for their disclosure of suitable esters and methods for their preparation. Generally, the weight ratio of the N-substituted morpholines of this invention to the aforesaid ashless dispersants is about 0.1 to about 10.0, preferably about 1 to about 10 parts of morpholine to 1 part ashless dispersant. In still another embodiment of this invention, the inventive additives are combined with Mannich condensation products formed from substituted phenols, aldehydes and polyamines, and/or substituted pyridines. Such condensation products are described in U.S. Pat. Nos. 3,649,659; 3,558,743; 3,539,633; 3,704,308; and 3,725,277.

The morpholines of this invention can be added directly to the fuel to form the fuel compositions of this invention or they can be diluted with an inert solvent/diluent such as mineral oil to form an additive concentrate which is then added to the fuel to form the inventive composition. These concentrates generally contain about 20 to about 90 percent of N-substituted morpholine of this invention and can contain in addition any of the above-described prior art additives, particularly the afore-described ashless dispersants in the aforesaid proportions.

The fuel compositions of this invention are exemplified by the following:

EXAMPLE 8

A gasoline having a Reid vapor pressure of 10.5 psi and containing 2.5 grams of lead per gallon and 100 parts per million parts of gasoline of the product described in Example 1.

EXAMPLE 9

A diesel fuel oil containing 200 parts per million parts of fuel of the product described in Example 4.

EXAMPLE 10

A gasoline having a Reid vapor pressure of 15 psi and containing 2.1 grams per gallon of tetraethyl lead and 15 parts per million parts of gasoline of the product described in Example 2.

The liquid fuel compositions of this invention have been specifically set forth above to aid those skilled in the art in understanding and practicing the invention. Many obvious variations and departures from the specific disclosure will be apparent to those of skill in the art based on principles and teachings herein and in the prior art. Such variations and departures are contemplated as being within the scope of the present invention as defined by the appended claims.

What is claimed is:

1. A fuel composition containing a major amount of a normally liquid fuel and a minor but detergent-producing amount of at least one N-substituted morpholine of the formula $$O(CH_2CH_2)_2NR'NR''$$
$$\overset{|}{R^3}$$

wherein R' is a divalent organic radical of at least one to about thirty carbon atoms, $R^3$ is a hydrogen atom or a monovalent hydrocarbyl, hydroxy-substituted hydrocarbyl or hydroxy hydrocarbyleneoxy-substituted hydrocarbyl radical of at least one carbon and R'' is a hydrocarbyl radical of at least about thirty carbon atoms.

2. A fuel composition as claimed in claim 1 wherein R' contains about one to about six carbon atoms and $R^3$ is hydrogen.

3. A fuel composition as claimed in claim 1 wherein R' is a $C_1$-$C_3$ aliphatic radical and R'' is of at least about forty carbon atoms.

4. A fuel composition as claimed in claim 1 wherein R' is interrupted with one to about six Y groups, Y is an oxygen or sulfur atom or a sulfinyl, sulfonyl, or amino group, said amino group being of the formula $>NR^3$, and R'' is of at least about forty carbon atoms.

5. A fuel composition as claimed in claim 4 wherein the N-substituted morpholine is of the formula $$O(CH_2CH_2)_2NR'NR''$$
$$\overset{|}{H}$$

wherein each Y is an —O— atom and R'' is of at least about forty carbon atoms.

6. A fuel composition as claimed in claim 1 wherein $R^3$ is R''.

7. A fuel composition as claimed in claim 1 wherein R'' contains at least about forty carbon atoms.

8. A fuel composition as claimed in claim 1 wherein R'' is derived from at least one member of the group of $C_{2-8}$ monoolefin polymers and halogenated $C_{2-8}$ monoolefin polymers and contains at least about forty carbon atoms.

9. A fuel composition as claimed in claim 8 wherein the monoolefin is a $C_4$ monoolefin.

10. A fuel composition as claimed in claim 1 wherein $R^3$ is a hydrogen atom and R'' is of at least about forty carbon atoms.

11. A fuel composition as claimed in claim 10 wherein R' is —$CH_2CH_2CH_2$—.

12. A fuel composition as claimed in claim 1 wherein the fuel is motor gasoline and R'' is of at least about forty carbon atoms.

13. A fuel composition as cclaimed in claim 12 also containing a minor amount of an ashless dispersant.

14. A fuel composition as claimed in claim 1 wherein $R^3$ is R'' and the fuel is motor gasoline.

15. A fuel composition as claimed in claim 1 wherein $R^3$ is a $C_1$ to $C_{19}$ hydrocarbyl group, the fuel is motor gasoline.

16. A fuel composition containing a major amount of motor gasoline and a minor carburetor detergency producing amount of N-substituted morpholine as claimed in claim 10 wherein the morpholine is prepared by reacting a chlorinated polyisobutylene with N-3-aminopropyl morpholine.

17. A composition as claimed in claim 16 wherein the N-substituted morpholine contains less than about 1.0% chlorine.

18. A fuel composition containing a major amount of a normally liquid fuel and a minor but detergent-producing amount of at least one N-substituted morpholine of the formula $$O(CH_2CH_2)_2NR'NR''$$
$$\overset{|}{R^3}$$

wherein R' is a divalent organic radical of at least one to about thirty carbon atoms and is interrupted with one to about six Y groups, Y is an oxygen or sulfur atom or a sulfinyl, sulfonyl or amino group, said amino group being of the formula $>NR^3$, $R^3$ is a hydrogen atom or a monovalent hydrocarbyl, hydroxy-substituted hydrocarbyl or hydroxy hydrocarbyleneoxy-substituted hydrocarbyl radical of at least one carbon and R'' is a hydrocarbyl radical of at least about thirty carbon atoms.

* * * * *